United States Patent
Liu et al.

(10) Patent No.: US 9,793,996 B2
(45) Date of Patent: Oct. 17, 2017

(54) SUB-NYQUIST SAMPLING FOR BANDWIDTH- AND HARDWARE-EFFICIENT MOBILE FRONTHAUL WITH MIMO PROCESSING

(71) Applicant: Futurewei Technologies, Inc., Plano, TX (US)

(72) Inventors: Xiang Liu, Marlboro, NJ (US); Lin Cheng, Atlanta, GA (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/262,906

(22) Filed: Sep. 12, 2016

(65) Prior Publication Data

US 2017/0078024 A1 Mar. 16, 2017

Related U.S. Application Data

(60) Provisional application No. 62/218,299, filed on Sep. 14, 2015.

(51) Int. Cl.
*H04B 10/27* (2013.01)
*H04B 10/2575* (2013.01)
(Continued)

(52) U.S. Cl.
CPC ....... *H04B 10/25759* (2013.01); *H04B 10/27* (2013.01); *H04L 5/02* (2013.01); *H04B 10/2504* (2013.01)

(58) Field of Classification Search
CPC ....... H04L 5/02; H04B 10/2504; H04B 10/27; H04B 10/25759
See application file for complete search history.

(56) References Cited

U.S. PATENT DOCUMENTS

| | | | |
|---|---|---|---|
| 2012/0177386 A1 | 7/2012 | Zhou et al. | |
| 2017/0019178 A1* | 1/2017 | Alic | H04B 10/2543 |
| 2017/0149502 A1* | 5/2017 | Krishnan | H04B 10/2513 |

FOREIGN PATENT DOCUMENTS

| | | |
|---|---|---|
| CN | 1025230448 A | 6/2012 |
| CN | 103825657 A | 5/2014 |
| CN | 104202090 A | 12/2014 |

OTHER PUBLICATIONS

Partial English Translation and Abstract of Chinese Patent Application No. CN102523048, Jun. 27, 2012, 7 pages.

(Continued)

*Primary Examiner* — Jean B Corrielus
(74) *Attorney, Agent, or Firm* — Conley Rose, P.C.

(57) ABSTRACT

A method implemented by a network device in a wireless system is provided. The method includes obtaining a plurality of electronic signals and selecting a first group of signals and a second group of signals from the plurality of electronic signals, generating phase conjugated copies of signals in the first group of signals, and aggregating the phase conjugated copies and a second group of signals into sub-bands in a frequency domain via frequency-domain multiplexing (FDM), wherein the phase conjugated copies are spectrally inverted in the frequency domain. The method may include converting the aggregated electronic signal to an aggregated optical signal, and transmitting the aggregated optical signal over a fiber link.

20 Claims, 8 Drawing Sheets

(51) Int. Cl.
*H04L 5/02* (2006.01)
*H04B 10/25* (2013.01)

(56) References Cited

OTHER PUBLICATIONS

Partial English Translation and Abstract of Chinese Patent Application No. CN103825657, May 28, 2014, 4 pages.
Partial English Translation and Abstract of Chinese Patent Application No. CN104202090, Dec. 10, 2014, 6 pages.
Foreign Communication From a Counterpart Application, PCT Application No. PCT/CN2016/099070, International Search Report dated Nov. 30, 2016, 4 pages.
Cheng, L., et al., "Experimental Demonstration of Sub-Nyquist Sampling for Bandwidth- and Hardware-Efficient Mobile Fronthaul Supporting 128×128 MIMO with 100-MHz OFDM Signals," W3C. 3.pdf, OFC 2016, OSA, 2016, 3 pages.

\* cited by examiner

FIG. 10

SUB-NYQUIST SAMPLING FOR BANDWIDTH- AND HARDWARE-EFFICIENT MOBILE FRONTHAUL WITH MIMO PROCESSING

CROSS-REFERENCE TO RELATED APPLICATIONS

The present application claims priority to U.S. provisional patent application No. 62/218,299 filed Sep. 14, 2015, entitled "Sub-Nyquist Sampling in Mobile Fronthaul (MFH)," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices and a core network. In traditional wireless macro-cell networks and mobile macro-cell networks, an area may be divided geographically into a plurality of cells and cell sectors, each served by a wireless base station communicating with the core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells.

Wireless fronthaul and mobile fronthaul are emerging network segments that enable a centralized-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central site nearby a central office (CO) or the core network. As such, the wireless base stations located at the remote cell sites are replaced by remote radio units (RRUs) that interface with antennae for wireless radio frequency (RF) transmission and reception without the digital BB processing. Wireless fronthaul refers to the part of the RAN between the RRUs and the BBUs. By relocating the digital BB processing to the centralized BBUs, the C-RAN architecture may enable resource sharing and coordinated multipoint (CoMP) processing, such as joint signal processing, joint interference mitigation, and/or joint scheduling among multiple cells, and thus may improve network performance and efficiency.

Wireless fronthaul may be enabled by optical fiber communication technologies, where optical fiber links are employed for transporting signals between the RRUs located at the remote cell sites and the BBUs located at the central site. Some advantages of optical fiber transmission include low power loss, low latency, and high bandwidth (BW). However, the employment of optical fibers and optical hardware add cost to the wireless fronthaul network. Thus, efficient use of optical fiber links and optical hardware are desirable in wireless fronthaul design.

SUMMARY

In one embodiment, the disclosure includes a method implemented by a network device in a wireless system. The method includes obtaining a plurality of electronic signals and selecting a first group of signals and a second group of signals from the plurality of electronic signals, generating phase conjugated copies of signals in the first group of signals, and aggregating the phase conjugated copies and the second group of signals into sub-bands in a frequency domain via frequency-domain multiplexing (FDM), wherein the phase conjugated copies are spectrally inverted in the frequency domain. The method may include converting the aggregated electronic signal to an aggregated optical signal, and transmitting the aggregated optical signal over a fiber link.

In some embodiments, the method may include performing an inverse fast Fourier transform (IFFT) on the aggregated electronic signal to generate an aggregated time domain signal, and converting the aggregated time domain signal into an aggregated analog waveform, which may be configured to have a frequency domain spectrum with equally spaced channels due to the aggregation of the phase conjugated copies and the second group of signals into sub-bands in the frequency domain via FDM. In one or more embodiments, the method may include mapping signals in the first group to respective phase conjugated and spectrally inverted copies, where the phase conjugated and spectrally inverted copies are interleaved with the second group of signals, which correspond to original signals selected from the plurality of electronic signals. In one or more embodiments, the phase conjugated copies and the second group of signals are uniformly mapped in the frequency domain. In one or more embodiments, the second group of signals and the phase conjugated copies are aggregated into the sub-bands while accounting for aliasing-induced effects associated with sampling the sub-bands at a sub-Nyquist sampling rate, which may comprise a sampling rate of fs/M, where fs is a Nyquist frequency and M is a real number greater than 1. In one or more embodiments, the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup. In one or more embodiments, the wireless system comprises a mobile fronthaul (MFH), where sampling is performed at an intermediate node in the MFH that comprises a remote radio unit (RRU) or a remote radio head (RRH).

In another embodiment, the disclosure includes a network device comprising a digital signal processing (DSP) unit configured to obtain a plurality of electronic signals and select a first group of signals and a second group of signals from the plurality of electronic signals, generate phase conjugated copies of signals in the first group of signals, and aggregate the phase conjugated copies and the second group of signals to generate an aggregated electronic signal. The phase conjugated copies and the second group of signals may be aggregated into sub-bands in a frequency domain via frequency-domain multiplexing (FDM), where the phase conjugated copies are spectrally inverted in the frequency domain. The network device may further comprise a digital to analog converted (DAC) configured to convert the aggregated electronic signal into an aggregated analog signal, and at least one transmitter configured to transmit the aggregated analog signal over a fiber link.

In some embodiments, the DSP may be configured to perform an inverse fast Fourier transform (IFFT) on the aggregated electronic signal to generate an aggregated time domain signal, and the DAC may be configured to convert the aggregated time domain signal into an aggregated analog waveform, which may have a frequency domain spectrum with equally spaced channels due to the aggregation of the phase conjugated copies and the second group of signals into sub-bands in the frequency domain via FDM. In one or more embodiments, the DSP unit may be configured to map signals in the first group to respective phase conjugated and spectrally inverted copies, where the phase conjugated and spectrally inverted copies are interleaved with the second group of signals, which correspond to original signals selected from the plurality of electronic signals. In one or more embodiments, the second group of signals and the phase conjugated copies may be uniformly mapped in the frequency domain. In one or more embodiments, the DSP unit may be configured to aggregate the second group of signals and the phase conjugated copies into the sub-bands while accounting for aliasing-induced effects associated with sampling the sub-bands at a sub-Nyquist sampling rate, which may comprise a sampling rate of fs/M, where fs is a Nyquist frequency and M is a real number greater than 1. In one or more embodiments, the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup. In one or more embodiments, the network device may be configured to perform massive multiple-input and multiple-output (m-MIMO) transmission in a mobile fronthaul (MFH), where sampling is performed at an intermediate node in the MFH that comprises a remote radio unit (RRU) or a remote radio head (RRH).

In yet another embodiment, the disclosure includes a non-transitory computer readable medium storing computer instructions, that when executed by one or more processors, cause the one or more processors to perform the steps of obtaining a plurality of electronic signals and selecting a first group of signals and a second group of signals from the plurality of electronic signals, generating phase conjugated copies of signals in the first group of signals, generating an aggregated electronic signal by aggregating the phase conjugated copies and the second group of signals into sub-bands in a frequency domain via frequency-domain multiplexing (FDM), wherein the phase conjugated copies are spectrally inverted in the frequency domain, converting the aggregated electronic signal to an aggregated optical signal, and transmitting the aggregated optical signal over a fiber link.

In some embodiments, the steps may include performing an inverse fast Fourier transform (IFFT) on the aggregated electronic signal to generate an aggregated time domain signal, and converting the aggregated time domain signal into an aggregated analog waveform, which may be configured to have a frequency domain spectrum with equally spaced channels due to the aggregation of the phase conjugated copies and the second group of signals into sub-bands in the frequency domain via FDM. In one or more embodiments, the steps may include mapping signals in the first group to respective phase conjugated and spectrally inverted copies, where the phase conjugated and spectrally inverted copies are interleaved with the second group of signals, which correspond to original signals selected from the plurality of signals. In one or more embodiments, the phase conjugated copies and the second group of signals are uniformly mapped in the frequency domain. In one or more embodiments, the second group of signals and the phase conjugated copies are aggregated into the sub-bands while accounting for aliasing-induced effects associated with sampling the sub-bands at a sub-Nyquist sampling rate, which may comprise a sampling rate of fs/M, where fs is a Nyquist frequency and M is a real number greater than 1. In one or more embodiments, the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In next generation systems, it may be difficult to implement adequate components to support high-speed data transmissions over an aggregated spectral bandwidth of about 10 gigahertz (GHz). For instance, conventional systems may utilize high-speed analog-to-digital converters (ADCs) to capture an aggregated waveform, or low-speed ADCs in combination with filters to cut off unwanted bands prior to sampling. However, the use of high-speed ADCs can be costly and increase design complexity, while the quality of filters that may be necessary to adequately filter unwanted bands prior to sampling by low-speed ADCs may need to be relatively high, thereby increasing filter cost and/or complexity. The concepts disclosed herein provide a cost- and bandwidth-efficient sub-Nyquist sampling scheme in which relatively simple filters and low-speed ADCs may be used to adequately capture waveforms in aggregated signals.

Figure 1:
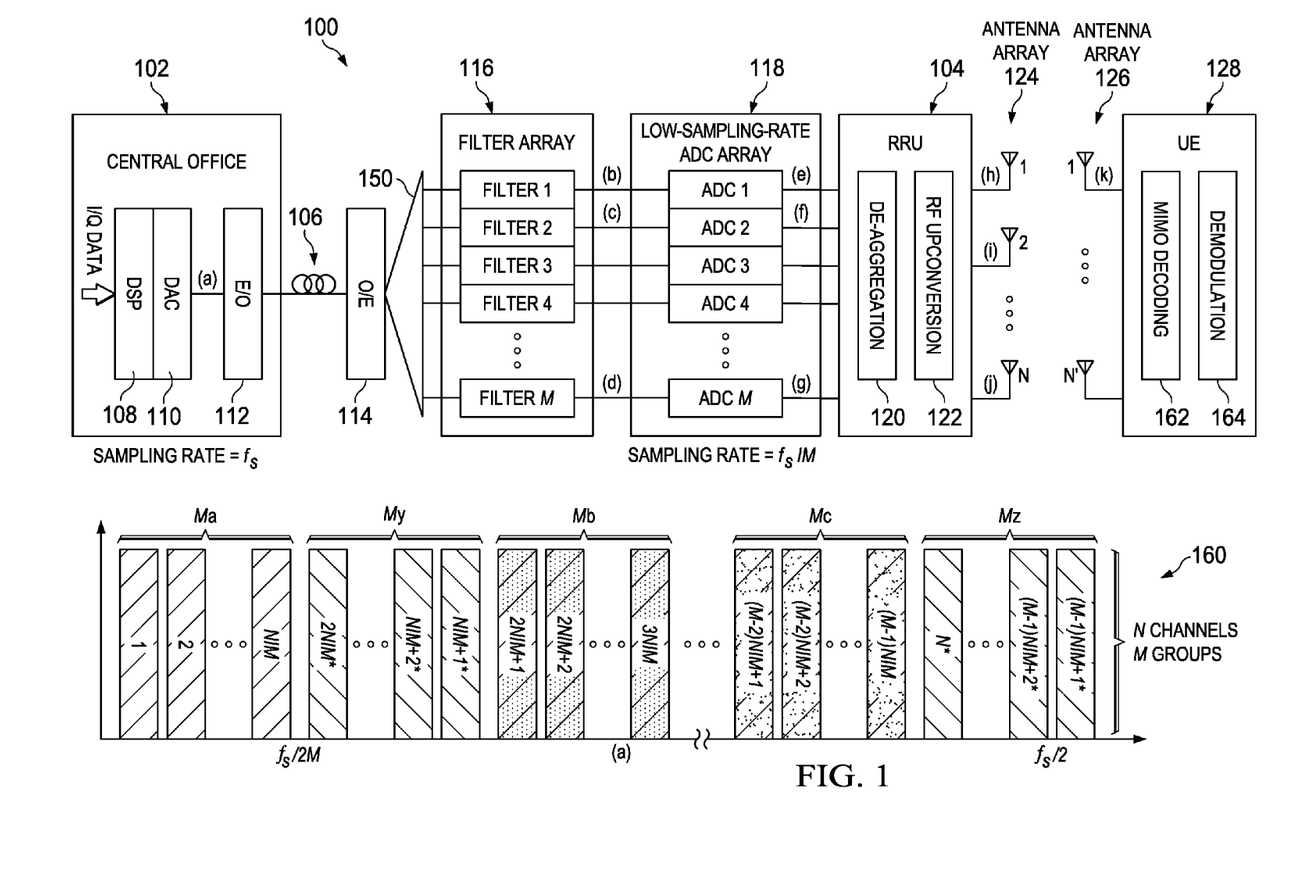
FIG. 1 depicts a schematic diagram of a mobile fronthaul (MFH) system according to an embodiment of the disclosure.

FIG. 1 depicts a mobile fronthaul (MFH) system 100 according to an embodiment of the disclosure. The MFH may comprises a central office (CO) 102 configured to communicate with at least one remote radio unit (RRU) 104 via a bi-directional link 106. It should be understood that the CO 102 can be in communication with one or more networks (not shown) and can communicate with multiple RRUs and/or multiple other devices. The CO 102 may therefore be coupled to multiple bi-directional links 106, although only one bi-directional link 106 is shown for simplicity.

In some implementations, the CO 102 may comprise a baseband unit (BBU) or a pool of BBUs configured to communicate with the RRU 104 via the link 106. The link 106 may comprise an optical fiber link such as a standard single-mode fiber (SSMF) or multi-mode fiber (MMF) link, a cable link (e.g., including coaxial cables), a free-space microwave link (e.g., including a line-of-sight propagation path), etc. The CO 102 may include a digital signal processing (DSP) unit 108 configured to aggregate digital in-phase/quadrature-phase (I/Q) samples, which may be converted into analog electronic signals by a digital to analog converter (DAC) 110. In FIG. 1, the total bandwidth may be denoted by $f_s/2$, where $f_s$ is the Nyquist frequency. According to some implementations, $f_s$ may correspond to the sampling rate of digital signals generated by the DSP unit 108. Additionally or alternatively, $f_s$ may correspond to the sampling rate used by the DAC 110 to generate analog signals.

The DSP unit 108 may perform various digital processing functions such as signal synchronization, modulation, demodulation, frame synchronization, channel pre-equalization, channel equalization, error encoding, error decoding, interference mitigations, etc. The DSP unit 108 may comprise one or more single-core processors, one or more multi-core processors, one or more general processors, and one or more DSP processors. The DSP unit 108 may perform various baseband (BB) functions for receiving and transmitting in uplink (UL) and downlink (DL) directions, respectively. In the UL direction, the DSP unit 108 may receive digital I/Q samples and generate data packets for transmission, e.g., to a core network via a backhaul link. In the DL direction, the DSP unit 108 may receive data packets (e.g., from a core network) and generate DL digital BB samples, such as for transmission to the RRU 104. Furthermore, the DSP unit 108 may perform various wireless MAC layer functions, such as packet processing, scheduling, and error controls.

The CO 102 may include an electrical-to-optical (E/O) frontend 112 configured to convert analog electronic signals into optical signals, and vice-versa. The E/O frontend 112 may include various E/O components such as electrical drivers, E/O converters, a laser, etc. In some aspects, the CO 102 may further include a multiplexer (not shown) configured to multiplex the optical signals onto the link 106 for transmission to the RRU 104. Additionally or alternatively, the DSP unit 108 may be configured to perform multiplexing operations.

The RRU 104 may include or be coupled to an optical-to-electrical (O/E) frontend 114, a filter array 116 having a number M of filters, and an analog-to-digital converter (ADC) array 118. The filter array 116 and ADC array 118 each comprise a number M of filters and ADCs, respectively, where M is a positive integer greater than or equal to one. Like the E/O 112 of the CO 102, the O/E frontend 114 may include O/E components such as electrical drivers, O/E converters, a laser, etc. The O/E frontend 114 may be configured to convert optical signals into at least one electrical signal, which may be split by a splitter 150 into a plurality of signals. According to one implementation, an optical amplifier (not shown) may be employed to amplify the power of an electrical signal from the O/E frontend 114, e.g., to facilitate splitting the electrical signal.

As discussed further below, the split electrical signals may be filtered by the filter array 116 and then converted by the ADC array 118 into digital electrical signals, which may be output to the RRU 104 for further processing. The RRU 104 may include a de-aggregation unit 120 configured to de-aggregate the electrical signals from the ADC array 118, and a radio frequency (RF) upconversion unit 122 configured to convert the de-aggregated signals into RF signals. In some aspects, the de-aggregation unit 120 may be implemented by a DSP unit (not shown), which may perform similar operations as the DSP unit 108. The RRU 104 may further include an antenna array 124 configured to communicate RF signals between the RRU 104 and an antenna array 126 of at least one user equipment (UE) 128. The UE 128 may include at least one decoder 162 and demodulator 164 to decode and demodulate data, respectively, such as downlink signals received from the RRU 104. In implementations involving multiple-input, multiple-output (MIMO) transmissions, multiple antennas (e.g., in arrays 124 and 126) may be used simultaneously communicate a plurality of data signals between the RRU 104 and the UE 128.

In general, the MFH system 100 may be configured to enable a cloud radio access network (C-RAN), where wireless signals from different remote antennas may be aggregated and transmitted by a central location such as the CO 102. In future wireless systems such as Fifth Generation (5G) and later, the aggregated spectral bandwidth of the wireless signals may be expected to reach or exceed about 10 gigahertz (GHz). To support high-speed data transmissions in future generation systems, it may be challenging to provide suitable interface components such as ADCs and DACs. For example, after wireless signals are aggregated at the CO 102 and transmitted over the link 106, the entire waveform may need to be captured (e.g., via ADC array 118) before being output to the RRU 104 for transmission to a UE 128. To this end, the MFH system 100 may implement various approaches.

In one approach, the ADC array 118 may employ relatively high-speed ADCs to capture an entire waveform, in which case the filter array 116 may not be necessary. However, designing the ADC array 118 with high-speed ADCs may lead to increased cost and/or complexity. Moreover, the resolution of ADCs typically decreases as their sampling rate increases. In another approach, the ADC array 118 may employ relatively low-cost, low-speed ADCs, in which case the filter array 116 may need to employ suitable filters, such as to sharply cut off aliasing. That is, the filters in the filter array 116 may need relatively sharp edges to filter out multiple sub-bands in order to avoid/reduce aliasing. Yet this may not only increase filter complexity, but it may not be feasible to design the filter array 116 with filters that are tunable in high frequencies at which 5G wireless systems may operate.

In an embodiment, the MFH system 100 may implement a cost- and hardware-efficient approach capable of supporting coordinated multipoint (CoMP) and multiple-input multiple-output (MIMO) transmissions in both existing and future wireless systems. Such transmissions may include N-N' massive MIMO (m-MIMO) transmissions, where gains in spectral efficiency may be obtained by utilizing a relatively large number of antennas to communicate with end users. As discussed below, the DSP unit 108 of the CO 102 may employ one or more frequency-domain multiplexing (FDM) schemes to perform channel aggregation. The term "aggregation" refers to the aggregation of a plurality of wireless channels or channel signals transported over a link 106 between the components of the MFH system (e.g., between the CO 102 and the RRU 104).

In one FDM scheme, a number of input signals (e.g., I/Q data) may be mapped to contiguous or non-contiguous (or frequency-interleaved) frequency bands in a frequency spectrum. For example, the DSP unit 108 may shift frequency components of input signals to contiguous or non-contiguous frequency bands (e.g., according to a pre-determined frequency map) and multiplex the frequency-shifted signals to produce an aggregated signal channel for transmission over the link 106. Moreover, the DSP unit 108 may generate spectrally-inverted and phase-conjugated copies of a first set of input signals, which may be interleaved with a second set of input signals that correspond to signals as originally received (e.g., signals not spectrally-inverted or phase-conjugated).

In operation, the CO 102 may receive a number N of incoming signals (e.g., I/Q data) from different channels. The DSP unit 108 may be configured to divide the N signals into M groups of channels. For convenience, the following discussion will use an example in which N is equal to 20 and M is equal to 5 (i.e., 4 channels per group). However, N and M may each be equal to any positive integer in other examples. According to one implementation, the DSP unit 108 may process signals within the M groups such that after aggregating the N channels using an FDM scheme, the aggregated signal may be uniformly mapped to sub-bands in the frequency domain. More specifically, the DSP unit 108 may aggregate incoming signals from N channels into a digital waveform having a time domain format, such that when converted by the DAC 110, the DAC 110 generates an aggregated analog waveform—denoted as output (a) in FIG. 1—whose frequency domain spectrum may have equally spaced channels, as shown by the graph 160. These and other features are detailed further below.

The DSP 108 may divide the 5 M groups into odd-numbered subgroups Ma, Mb, and Mc and even-numbered subgroups My and Mz, where signals in the odd-numbered subgroups Ma, Mb, and Mc may maintain their original form, i.e., as received over respective channels. For example, in the graph 160, channel signals 1, 2, 3 (not shown), and 4 (N/M) in subgroup Ma correspond to the original signals received via channels 1-4. Likewise, channel signals 9 (2N/M+1), 10 (2N/M+2), 11 (not shown), and 12 (3N/M) in subgroup Mb correspond to the original signals received via channels 9-12, while channel signals 13 ((M−2)N/M+1), 14 ((M−2)N/M+2), 15 (not shown), and 16 ((M−1)N/M) in subgroup Mc correspond to the original signals received via channels 13-16. In graph 160, channel signals in the odd-numbered subgroups Ma, Mb, and Mc include shaded lines extending upward from left to right, indicating that the polarity of these signals is positive.

Unlike the odd-numbered subgroups, signals in the even-numbered subgroups My and Mz may correspond to original signals that have been spectrally inverted during an FDM process. In particular, the DSP unit 108 may perform a spectral inversion operation on the original signals received via channels 5-8 and channels 17-20 to generate phase-conjugated copies of those signals. For example, in graph 160, subgroup My includes channel signals 8* ((2N/M)*), 7* (not shown), 6* ((N/M+2)*), and 5* ((N/M+1)*), and subgroup Mz includes channel signals 20* (N*), 19* (not shown), 18* (((M−1)N/M+2)*), and 17* (((M−1)N/M+1)*), where * denotes spectrally-inverted and phase-conjugated copies of the indexed channel signals. Channel signals 5*, 6*, 7*, and 8* in subgroup My correspond to spectrally-inverted and phase-conjugated copies of signals originally received from channels 5, 6, 7, and 8, respectively, while channel signals 17*, 18*, 19*, and 20* in subgroup Mz correspond to spectrally-inverted and phase-conjugated copies of signals originally received from channels 17, 18, 19, and 20, respectively. Further, channel signals in subgroups My and Mz include shaded lines extending downward from left to right, indicating that the polarity of these signals is negative (i.e., due to the spectral inversion operation).

In an embodiment, the DSP unit 108 may uniformly map the N channels of signals in the frequency domain as shown in graph 160, where signals received via channels 5-8 and 17-20 may be mapped to their spectrally-inverted and phase-conjugated copies in subgroups My and Mz. In some aspects, the DSP unit 108 may modulate frequency components such as sub-carriers of incoming signals (e.g., I/Q data) received via N channels, where a collection of sub-carriers may form a channel. The DSP unit 108 may aggregate a group of channels to sub-bands in the frequency domain via FDM, where each sub-carrier may have a given modulation. The modulation format used to modulate each sub-carrier may vary according to system requirements. After modulation, the DSP unit 108 may perform an inverse Fourier transform (IFFT) operation to convert the frequency domain signal to an aggregated time domain signal. The DAC unit 110 may convert the time domain signal into an aggregated analog electrical signal, which the E/O frontend 112 may convert into an optical signal for transmission through the link 106.

Upon transmission, the O/E frontend 114 may receive and convert the optical signal into an electrical signal. As previously discussed, the electrical signal may be amplified before being split by the splitter 150. The splitter 150 may comprise a 1×M splitter configured to split one electrical signal to generate M copies of the electrical signal, which may be represented as electrical signals S1, S2, . . . SM. The M copies may be output from the splitter 150 to the filter array 116, where Filter 1, Filter 2 . . . Filter M filter may filter electrical signals S1, S2, . . . SM, respectively. The outputs from Filter 1, Filter 2, and Filter M are denoted as (b), (c), and (d) in FIG. 1. Examples of these outputs are depicted graphically in FIG. 2, where graphs 200, 202, and 204 correspond to spectral outputs from Filters 1, 2, and M, respectively. These spectral outputs correspond to an implementation where the filter array 116 may employ relatively simple filters that lack the type of sharp edges used in anti-aliasing filters.

Figure 2:
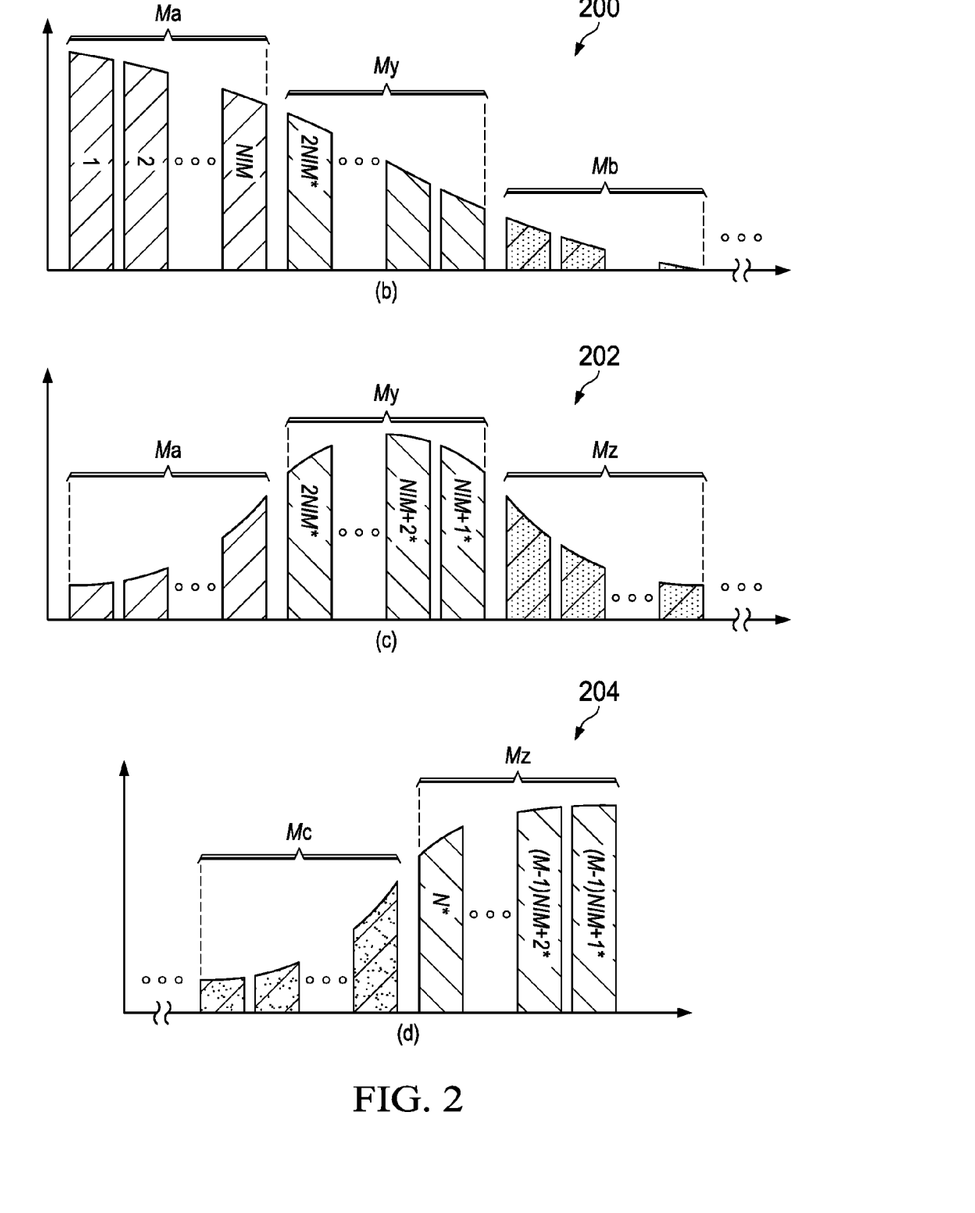
FIG. 2 depicts examples of spectral outputs from a filter array depicted in FIG. 1.

In an ideal filter array 116, the outputs from each Filter 1, Filter 2 . . . Filter M would only comprise frequency components corresponding to each channel signal 1, 2, . . . M, respectively. For example, the spectral output from Filter 1 would ideally contain channels signals or sub-bands corresponding solely to the first subgroup Ma. However, since the filter array 16 may employ relatively simple filters in this implementation, the M filters may loosely filter the M copies of electrical signals S1, S2 . . . SM such that higher frequency components of channel signals from other subgroups leak through. Thus, the spectral output from Filter 1 may include some unwanted channel signals or sub-bands from subgroups My and Mb, as shown in graph 200. Likewise, graph 202 shows that the spectral output from Filter 2 may include some unwanted channel signals from Ma and Mb, while graph 204 shows that the output from Filter M may include some unwanted channel signals from Mc. These unwanted channel signals will be addressed later below.

As shown in FIG. 1, output signals from the filter array 116 may be parallel sampled at the ADC array 118, where ADC 1, ADC 2 . . . ADC M may convert respective electrical signals from Filter 1, Filter 2 . . . Filter M into digital electrical signals. Outputs from ADCs 1, 2, and M are denoted as (e), (f), and (g) in FIG. 1, and examples of these outputs are depicted graphically in FIG. 3, where graphs 300, 302, and 304 correspond to spectral outputs from ADCs 1, 2, and M, respectively. These spectral outputs correspond to an implementation where the ADC array 118 may employ relatively low-speed ADCs. Consequently, outputs from the ADC array 118 may include interference such as aliasing-induced cross-talk among channel signals in different subgroups. According to the Nyquist sampling theorem, aliasing may be avoided if the sampling rate is at least twice the highest frequency contained in the signal. Thus, aliasing may occur by sampling at a rate below the Nyquist frequency for a particular signal.

In an embodiment, the M ADCs may operate at a sampling rate of $f_s/M$. For example, Filter 1 may output an electrical signal including frequency components of channel signals associated with subgroups Ma, My, and Mb, as shown in graph 200. The ADC 1 may use a sampling rate of $f_s/M$ to sample sub-bands of the electrical signal from Filter 1 and generate a digital waveform. In this example, channel signals associated with subgroup Ma are at a lower frequency than the Nyquist sampling frequency of ADC 1, whereas channel signals associated with subgroups My and Mb are at a higher frequency than the sampling Nyquist frequency of ADC 1. Consequently, sampling sub-bands of channel signals associated with subgroups My and Mb at a lower sampling rate of $f_s/M$ may cause those signals to become aliased, or "folded back" onto the spectrum at a lower frequency.

Figure 3:
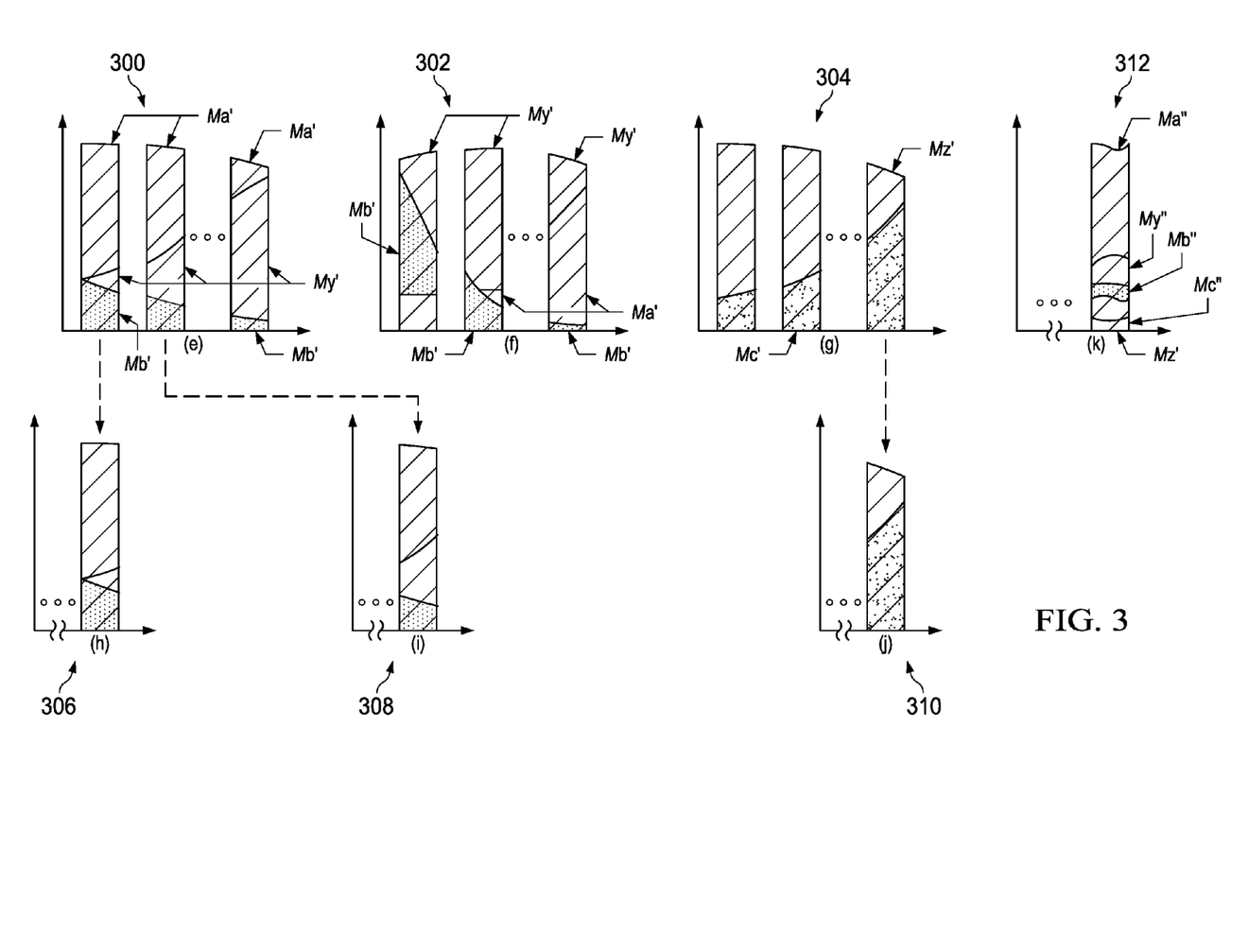
FIG. 3 depicts examples of spectral outputs generated at one or more intermediate nodes in FIG. 1.

Due to the aliasing effect resulting from the sampling operation by ADC 1, the polarity of higher frequency channel signals associated with subgroup My in the spectral output (graph 200 of FIG. 2) from Filter 1 may shift from negative to positive, as indicated by the shaded lines extending upward from left to right in the spectral output of graph 300 of FIG. 3, where the sampled outputs associated with Ma, My, and Mb are denoted as Ma', My', and Mb'. In contrast, the polarity of higher frequency signals associated with subgroup Mb may ultimately remain the same after being sampled by ADC 1 since those channel signals are two frequency bands away from the channel signals associated with subgroup Ma, as shown in the spectral output of graph 200. For example, the sampling operation may cause channel signals associated with subgroup Mb to become inverted or folded back twice (e.g., rotated by $2\pi$ radians or 360°), thereby maintaining the positive polarity of these signals as shown in graph 300.

Like graph 300, graph 302 shows that the spectral output from ADC 2 may include unwanted interference (e.g., Ma' and Mb') from channel signals associated with subgroups Ma and Mb, and graph 304 shows that the spectral output from ADC M may include unwanted interference (e.g., Mc') from channel signals associated with subgroup Mc. While the spectral outputs from ADC 1, ADC 2, and ADC M may each include some unwanted interference from different subgroups, the DSP unit 108 may map the N channels to sub-bands such that channel signals associated with each subgroup all share the same polarity, as shown in graphs 300-304.

For example, graph 200 in FIG. 2 shows that the output from Filter 1 contains some unwanted channel signals associated with subgroups My and Mb. The DSP unit 108 may predict that these unwanted channel signals will appear based on the knowledge that the filter array 116 does not employ filters having sharp edges. The DSP unit 108 may also predict that when ADC 1 samples an output from Filter 1 using a low-sampling rate, ADC 1 will produce a digital output having interference due to the unwanted channel signals becoming aliased. By taking these factors into account, the DSP unit 108 may map the N channel signals such that each of the M ADCs generate outputs that can be decoded (e.g., via decoder 162) without significant computational difficulty or complexity.

More specifically, due to the use of the low speed M filters at the filter array 116 and the low sampling rate of the M ADCs in the ADC array 118, the DSP unit 108 may anticipate spectral inversions resulting from the aforementioned aliasing effects. Hence, when mapping the N channels to the frequency domain, the DSP unit 108 may account for unwanted channel signals and aliasing effects such that after sampling by the ADC array 118, frequency components of channel signals in different subgroups will be aliased or "folded back" together in an orderly fashion. To this end, the DSP unit 108 may spectrally invert even-numbered subgroups (My and Mz) with respect to odd-numbered subgroups (Ma, Mb, and Mc) so that when a sub-bands of a filtered electrical signal is sampled, the ADC array 118 may generate an output comprising frequency components from different subgroups that are linearly superimposed with one another.

For example, although graph 300 in FIG. 3 shows that the spectral output from ADC 1 may include unwanted interference from channel signals associated with subgroups My and Mb, graph 300 also shows that channel signals associated with subgroups Ma, My, and Mb may be combined as components sharing the same polarity and positions. Consequently, frequency components of channel signals associated with all three subgroups Ma, My, and Mb in graph 300 may be expressed mathematically as a linear combination, e.g., a linear matrix may be used to represent the digital waveform generated by ADC 1.

As shown in graphs 302 and 304, ADC 2 and ADC M may generate similar spectral outputs as ADC 1. Therefore, digital waveforms outputs by each of the M ADCs may be expressed in a similar manner. For instance, in MIMO and beamforming transmissions, signals transmitted from a network device (e.g., RRU 104) may interfere with one another at a receiver (e.g., via array 126). To recover signals in such cases, the receiver may utilize various interference cancellation schemes such as matrix inversion, channel transfer function inversion, adaptive filtering, etc. As discussed below, similar schemes may be employed to cancel interference or otherwise decode digital waveforms generated by the MADCs.

The digital waveforms generated by the MADCs may be input to the RRU 118. In turn, the de-aggregation unit 120 may de-aggregate the M waveforms to generate a plurality of de-aggregated signal channels. The RF conversion unit 122 may convert the de-aggregated signal channels into N overlapped channels, each containing both the original channel and the aliasing components, as illustrated in graphs 306, 308, and 310 in FIG. 3, which correspond to outputs denoted in FIG. 1 as (h), (i), and (j), respectively. The RRU 118 may then transmit these N channels to the UE 128 via the antenna array 124.

The antenna array 126 at the UE 128 may comprise N' antennas, each of which may be configured to receive signals—denoted as (k) in FIG. 1—from N antennas of the antenna array 124 at the RRU 104. The signals received at the UE may comprise a combination of the N channels, as shown in graph 312 of FIG. 3, where channel signals associated with subgroups Ma, My, Mb, Mc, and Mz are denoted as Ma", My", Mb", Mc", and Mz". For simplicity, if each of the N channels is treated as one element, the received signals at N' receiving antennas of array 126 may be expressed mathematically as follows:

$$Y = H_{MIMO} H_A X + \Delta \quad (1)$$

where Y denotes a received MIMO signal matrix, X denotes an N×1 vector comprising the N channels of data, $H_{MIMO}$ denotes an N'×N matrix representing wireless channel characteristics for MIMO transmission, $H_A$ denotes an N×N matrix representing characteristics of the aliasing process, and $\Delta$ denotes an N×1 vector representing noise.

$H_A$ may be composed of diagonal submatrices having a size of M×M, in which each element may correspond to the frequency response of a filter at a channel frequency. The effect of $H_A$, filtering, and sub-Nyquist sampling may be transparent to users, and $H_{MIMO} H_A$ may come as a joint matrix in terms of estimation. In other words, a typical UE 128 may use standard recovery methods or units such as a MIMO decoder 162 and demodulator 164 to obtain signals in a conventional manner without additional processing or hardware requirements.

Accordingly, embodiments of the present disclosure may reduce overall cost and design complexity by employing an ADC array 118 comprising low-speed ADCs configured to operate at relatively low sampling rates, which may increase quantization resolution to improve signal quality. Moreover, high-order anti-aliasing filters—which might otherwise be necessary when using low-speed ADCs—may be replaced by low-order counterparts such an array of low-speed filters 116. Furthermore, no modifications to the UE 128 may be necessary, as conventional schemes (e.g., MIMO decoding, interference cancellation, etc.) may be used to jointly recover data from spectral aliasing and m-MIMO transmissions.

In some implementations, the RRU 104 may employ a MIMO beamforming operation using a number N of antennas at the antenna array 124 to simultaneously transmit data over M' independent channels to a set of end users (e.g., UE 128), such that channel capacity may be increased by a factor of M' via MIMO transmission. M' may be any positive integer between 1 and N, while U may be used to denote the number of end users simultaneously receiving data. To achieve beamforming and/or diversity gain, the RRU 104 may generate N/M'/U correlated copies of data for transmission to each group. Performance gain due to beamforming in this case may be equal to N/M'/U. Thus, when N=64, M'=2, and U=4, the RRU 104 may use 8 independent channels for beamforming a separate data stream to each end user, thereby enhancing gain by a factor of 8. In this example, phasing information to perform the beamforming operation may be calculated at the CO 102 and provided to the RRU 104.

In another implementation, the RRU 104 may utilize all N antennas to transmit data over M' independent channels to individual end users. For example, when N=64, M'=64, and U=1, channel capacity may increase by simultaneously supporting 64 end users (though gain may not increase). In this example, the RRU 104 may calculate the phasing information for the beamforming operation and separately transmit this information to the end users.

In yet another implementation, the RRU 104 may utilize M' groups of independent channels for a beamforming transmission to a single end user. In this case, the RRU 104 may generate N/M' correlated copies of data for each group of channels, where each copy may have different phase offsets to achieve beamforming. Performance gain due to beamforming in this case may be equal to N/M'. For example, when N=64 and M'=2, 16 channels may be used to transmit data to the single end user, thereby enhancing gain by a factor of 16.

Figure 4:
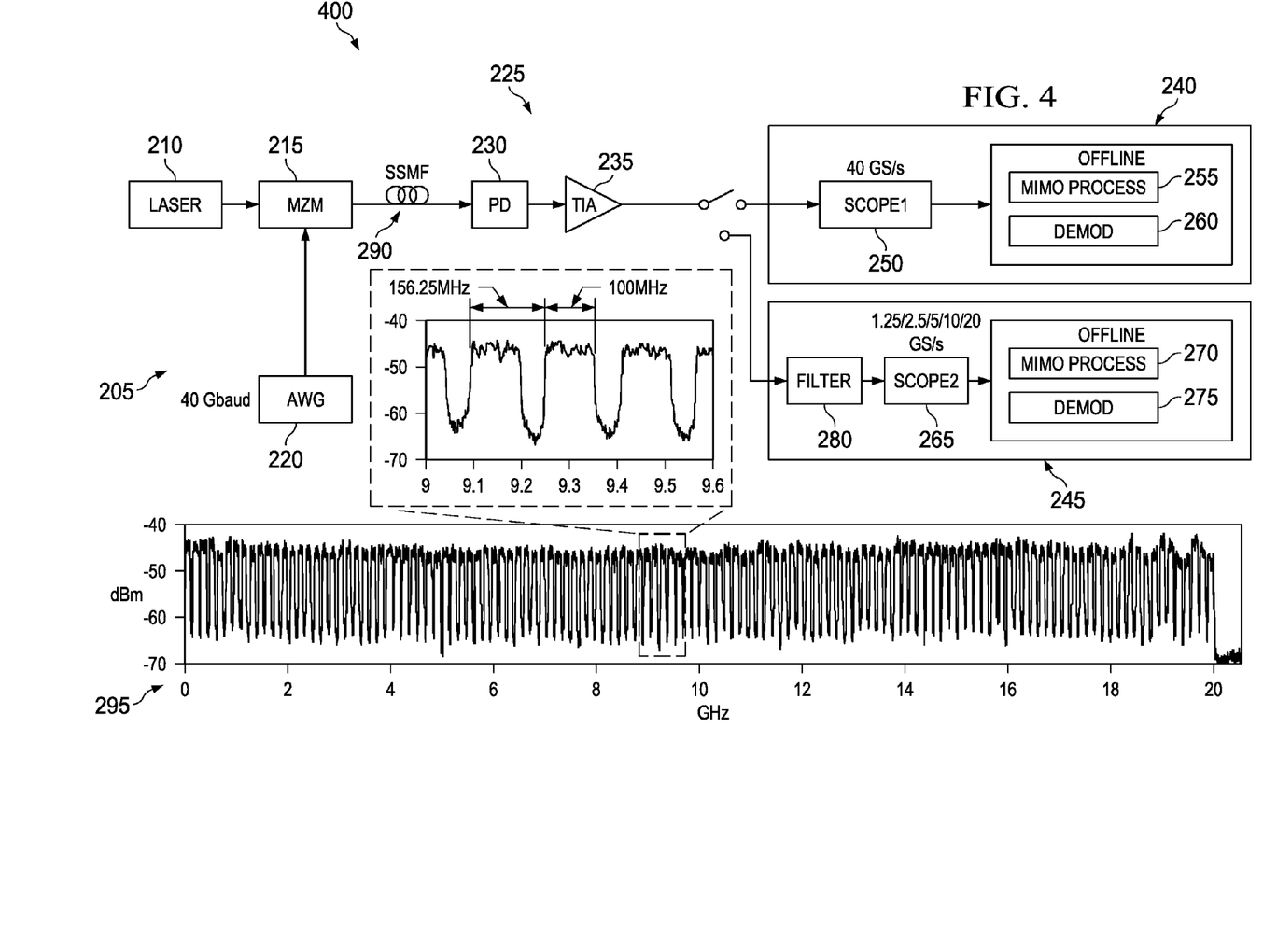
FIG. 4 depicts a schematic diagram of an MFH system according to an embodiment of the disclosure.

FIG. 4 depicts an embodiment of an aggregated wireless fronthaul communication system 400, which may be similar to the MFH system 100 in some embodiments. The system 400 comprises a transmit side 205 including a laser 210 coupled to a Mach-Zehnder modulator (MZM) 215, which may be driven by an arbitrary waveform generator (AWG) 220. The AWG 220 may comprise a 64-GS/s (gigasamples per second) AWG that operates at 40 gigabaud (Gbd) (i.e., $f_s$=40 GHz) in some embodiments. The laser 210 may comprise a light source such as a direct modulation laser (DML) configured to produce an optical signal, which may be modulated onto a 1550 nanometer (nm) optical carrier by the MZM 215 and launched to a standard single mode fiber (SSMF) 290 with various distances, where the SSMF 290 emulates an optical link. The system 400 further comprises a receive side 225 including a 20 GHz bandwidth photo detector (PD) 230 integrated with a transimpedance amplifier (TIA) 235, which may attenuate an optical signal with variable attenuations.

In operation, the AWG 220 may generate 128 156.25-MHz-spaced 100-MHz (megahertz) wireless channels occupying 20-GHz bandwidth. Each 100-MHz channel may comprise orthogonal frequency-division multiplexing (OFDM) signals with 16 quadrature amplitude modulation (16-QAM) for subcarrier modulation and 1/5 cyclic prefix. An example of the output spectrum from the AWG 220 is shown by the graph 295, where the x-axis represents frequency in units of GHz and the y-axis represents relative power in decibel (dB) units.

At the receive side 225, the optical signal is detected by the 20 GHz bandwidth PD 230, which may convert the optical signal into an analog electrical signal. The system 400 may include first and second recovery units 240 and 245 coupled to the receive side 225 and configured to perform 128×128 MIMO processing offline in some embodiments. As shown in FIG. 4, both recovery units 240 and 245 include oscilloscopes (or other sampling devices) configured to sample the received signal at different sampling rates for comparison. For example, one recovery unit 240 may include a first oscilloscope 250 operating at 40 GS/s and configured to sample the received signal in a traditional manner. The first oscilloscope 250 may include or be coupled to at least one high-speed ADC (not shown) configured to convert the sampled signal into a digital signal, which may then be processed by a MIMO module 255 and demodulated by a demodulator 260 (e.g., as would be done by UE 128).

The other recovery unit 245 may include a second oscilloscope 265 operating at various sub-Nyquist rates and configured to sample the received signal according to an approach employed by the MFH system 100. The second oscilloscope 265 may include or be coupled to at least one low-speed ADC (not shown) such as one used in the ADC array 118, where the sampled signal may be converted into a digital signal and then processed by a MIMO module 270 and demodulated by a demodulator 275. In some aspects, the low-speed oscilloscope 265 may be preceded by a filter 280 such as one used in the filter array 116. Different numbers of channels may be selected from the 128 channels and set as known symbols to emulate recovery of a MIMO-based signal, as only one low-speed oscilloscope 265 is available in the experimental setup.

Figure 5:
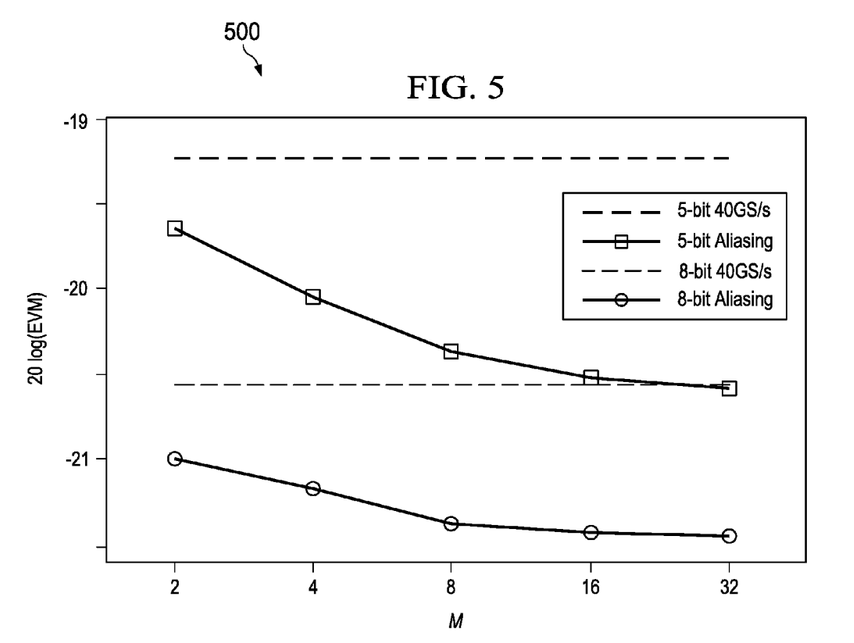
FIG. 5 depicts a graph illustrating error vector magnitudes (EVMs) measured at the system of FIG. 4.

FIG. 5 is a graph 500 illustrating a comparison between error vector magnitudes (EVMs) measurements and under-sampling factors M. The graph 500 is based on EVMs measured by the system 400 at a received optical power of about −10 dBm. The response M=1 is represented by the topmost linear dotted line, which corresponds to a sampling rate of 40 GS/s, e.g., as used by the first oscilloscope 250. At M=32, performance gain is about 1 dB. It is apparent from FIG. 5 that as M increases, the sampling rate (e.g., at each ADC in array 118) decreases and the EVM increases, thus confirming performance benefits of employing a sub-Nyquist sampling approach as disclosed herein. It is also apparent that performance benefits become even larger when the resolution at both oscilloscopes 250 and 265 is reduced from 8 bits to 5 bits.

Figure 6:
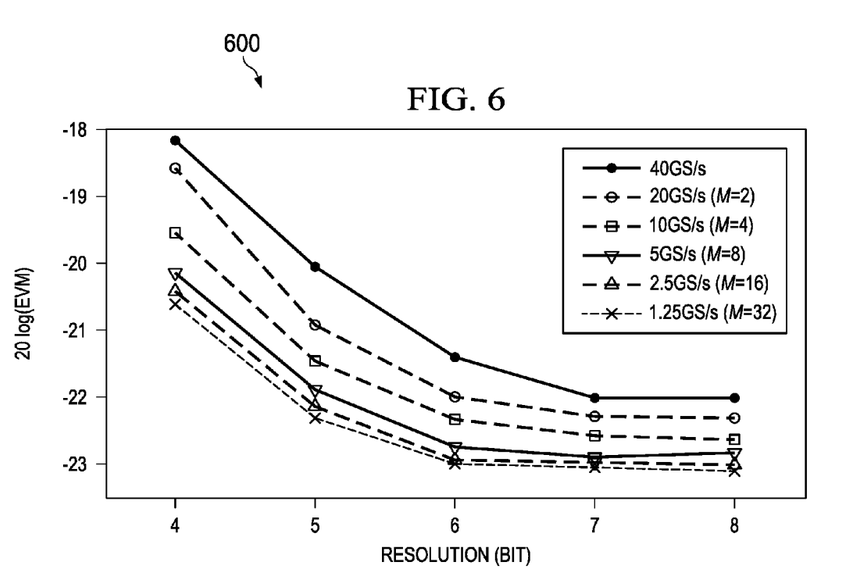
FIG. 6 depicts a graph illustrating EVMs versus resolution.

FIG. 6 is a graph 600 illustrating a comparison between EVM measurements and quantization resolution. More specifically, the graph 600 shows the relationship between EVM measurements by the system 400 and an ADC sampling resolution at a received optical power of about −10 dBm. Graph 600 is based on implementation where at one filter (e.g., Filters 1-M or filter 280) is used to filter a signal before being sampled (e.g., via ADC array 118 or oscilloscope 265). It is apparent from graph 600 that by using the filter array, the effective dynamic range of an ADC with limited bits may increase. Thus, the proposed method is less sensitive to quantization loss. Further, at 5-bit resolution (M=32), 1.25-GS/s sampling leads to an EVM reduction of about 2 dB.

Figure 7:
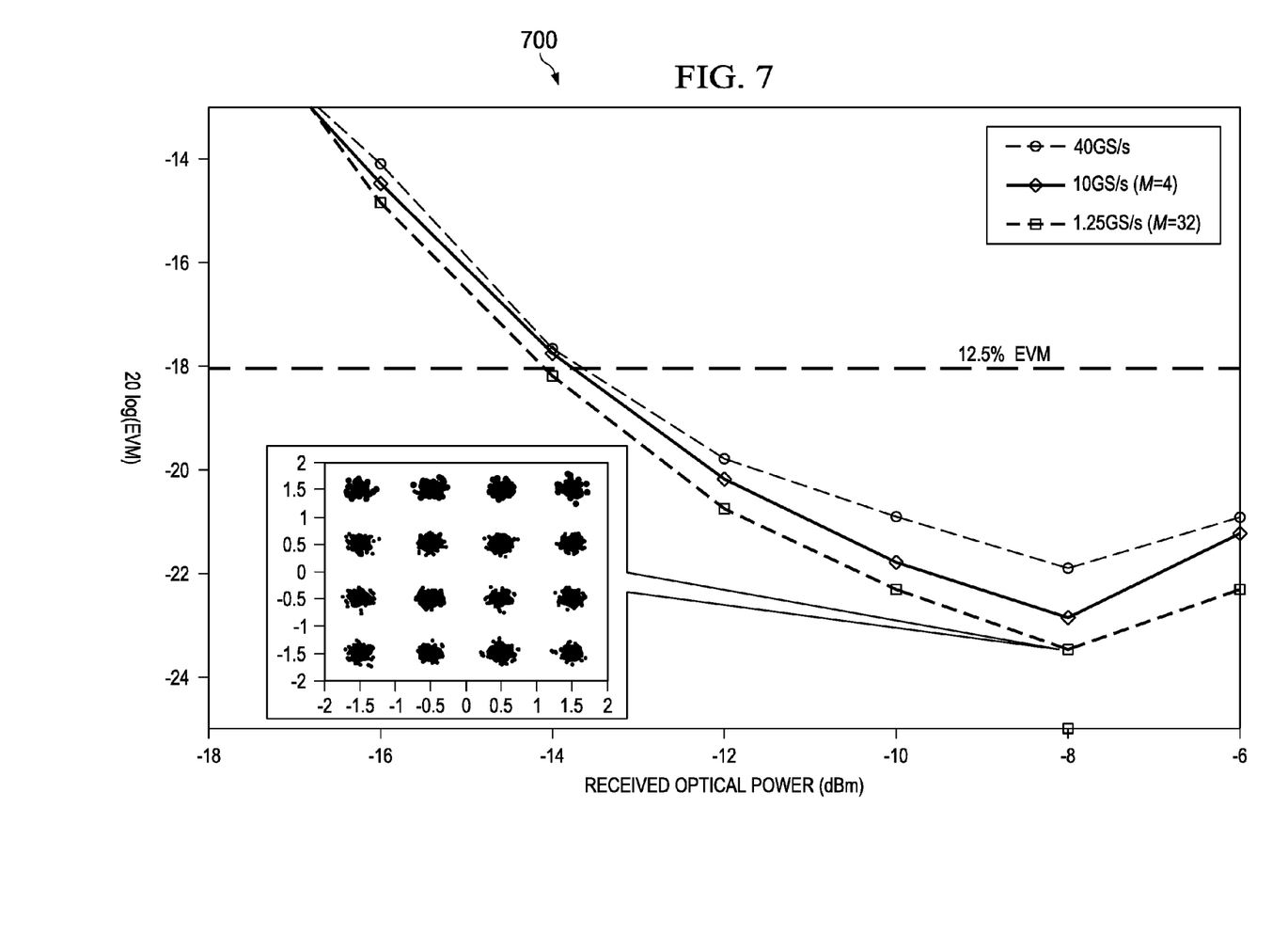
FIG. 7 depicts a graph illustrating EVMs versus received optical power.

FIG. 7 is a graph 700 illustrating a comparison between EVM measured at the system 400 after transmission over a 20 kilometer (km) SSMF (e.g., SSMF 290) and received optical power in units of decibel-milliwatt (dBm). At a sampling rate of 1.25 GS/s, the lowest EVM reaches −23.5 dB or 6.68%, which is well below the 12.5% typically required for 16QAM-OFDM transmission over a fiber link (e.g., link 106). It is apparent from graph 700 that at an optimal power region, operating the second oscilloscope 265 at a sampling rate of 1.25 GS/s (M=32) leads to an EVM improvement of about 1.5 dB, as compared to operating the first oscilloscope 250 at a sampling rate 40 GS/s (M=1).

Figure 8:
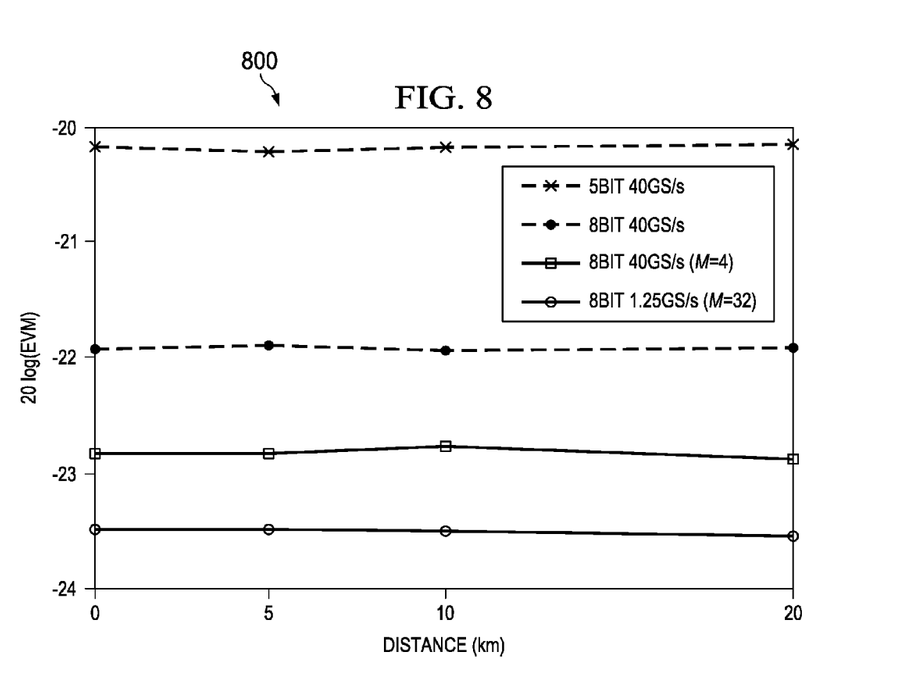
FIG. 8 depicts a graph illustrating EVMs versus optical fiber transmission distances.

FIG. 8 is a graph 800 illustrating a comparison between EVM measurements and transmission distances. The graph 800 is based on EVM measured by the system 400 at a received optical power of about −8 dBm. It is apparent from the graph 800 that no noticeable dispersion-induced penalty is observed at distances up to 20 km.

Figure 9:
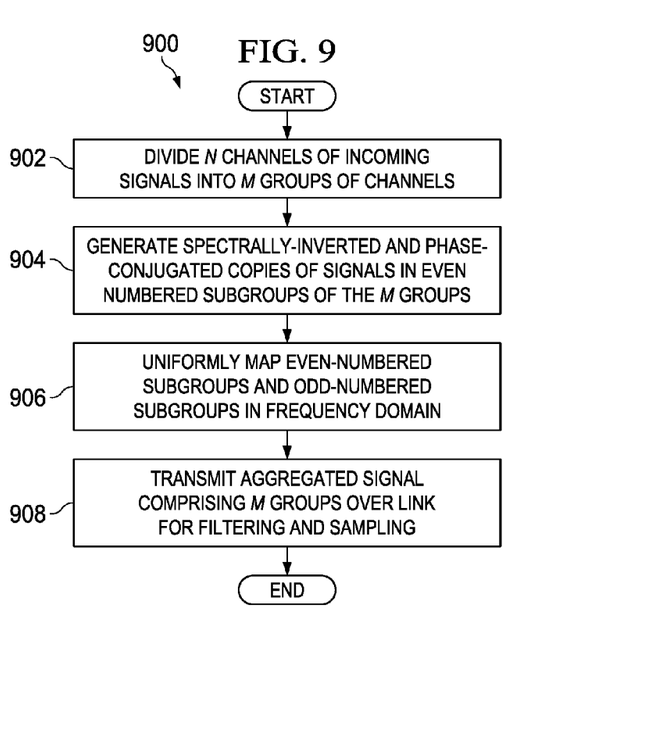
FIG. 9 depicts a flowchart for channel aggregation according to an embodiment of the disclosure.

FIG. 9 is a flowchart illustrating a method 900 implemented by a network device in a wireless system according to an embodiment of the disclosure. The operations may be performed in the order shown, or in a different order. Further, two or more of the operations may be performed concurrently instead of sequentially. In general, the method 900 may be implemented by the CO 102 and/or 104 RRU, for example, when transmitting a plurality of channel signals to at least one end user.

The method 900 commences at block 902, where a plurality of signals, received over N channels, is divided into M groups. At block 904, the method 900 generates spectrally-inverted and phase-conjugated copies of signals in even-numbered subgroups selected from the M groups. At block 906, the method 900 may uniformly map even-numbered subgroups and odd-numbered subgroups in the M groups into a frequency domain. For example, signals in the even-numbered and odd-numbered subgroups may be aggregated into sub-bands in the frequency domain via FDM. At block 908, the method 900 may transmit an aggregated signal comprising the M groups over a link. The channel signals within the M groups may be coarsely filtered (e.g., via array 116) to obtain multiple filtered sub-bands, which may be subsequently sampled (e.g., via array 118) at a low-sampling rate, e.g., a sub-Nyquist sampling rate of fs/M. As discussed above, the mapping of the M groups may take into account foreseeable aliasing effects such that a receiver (e.g., the UE 128) may sort out interference in sampled outputs with relative ease.

Figure 10:
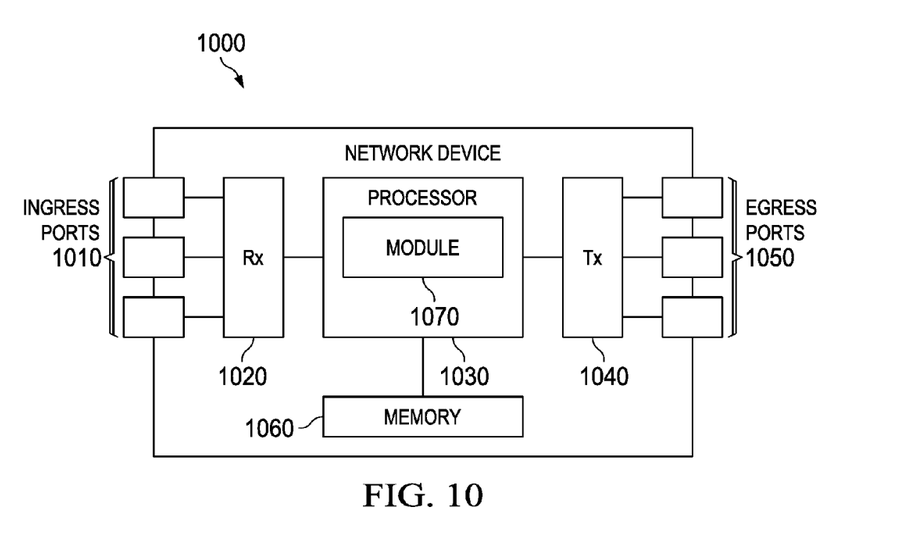
FIG. 10 depicts a schematic diagram of a network device according to an embodiment of the disclosure.

FIG. 10 depicts a schematic diagram of a network device 1000 according to an embodiment of the disclosure. The network device 1000 is suitable for implementing the disclosed embodiments as described herein. The network device 1000 comprises one or more ingress ports 1010 and a receiver unit (Rx) 1020 for receiving data; at least one processor, microprocessor, logic unit, or central processing unit (CPU) 1030 to process the data; a transmitter unit (Tx) 1040 and one or more egress ports 1050 for transmitting the data; and a memory 1060 for storing the data. The network device 1000 may also comprise optical-to-electrical (OE) components and electrical-to-optical (EO) components coupled to the one or more ingress ports 1010, the receiver unit 1020, the transmitter unit 1040, and the one or more egress ports 1050 for egress or ingress of optical or electrical signals.

The at least one processor 1030 may be implemented by hardware and/or software. The at least one processor 1030 may be implemented as one or more CPU chips, cores (e.g., as a multi-core processor), field-programmable gate arrays (FPGAs), application specific integrated circuits (ASICs), or digital signal processors (DSPs). The at least one processor 1030 may be communicatively linked to the one or more ingress ports 1010, receiver unit 1020, transmitter unit 1040, one or more egress ports 1050, and/or memory 1060.

The at least one processor 1030 comprises a module 1070 configured to implement the embodiments disclosed herein, including method 900. The inclusion of the module 1070 may therefore provide a substantial improvement to the functionality of the network device 1000 and effects a transformation of the network device 1000 to a different state. Alternatively, the module 1070 may be implemented as readable instructions stored in the memory 1060 and executable by the at least one processor 1030. The network device 1000 may include any other means for implementing the embodiments disclosed herein, including method 900.

The memory 1060 comprises one or more disks, tape drives, or solid-state drives and may be used as an over-flow data storage device, to store programs when such programs are selected for execution, or to store instructions and data that are read during program execution. The memory 1060 may be volatile or non-volatile and may be read-only memory (ROM), random-access memory (RAM), ternary content-addressable memory (TCAM), or static random-access memory (SRAM).

In an embodiment, the disclosure includes means for implementing a method by a network device in a wireless system. The network device includes means for obtaining a plurality of electronic signals and selecting a first group of signals and a second group of signals from the plurality of electronic signals, means for generating phase conjugated copies of signals in the first group of signals, and means for generating an aggregated electronic signal by aggregating the phase conjugated copies and the second group of signals into sub-bands in a frequency domain via frequency-domain multiplexing (FDM), wherein the phase conjugated copies are spectrally inverted in the frequency domain. In some aspects, the network device includes means for converting the aggregated electronic signal to an aggregated optical signal, and means for transmitting the aggregated optical signal over a fiber link.

In an embodiment, the disclosure includes a network device having means for obtaining a plurality of electronic signals and selecting a first group of signals and a second group of signals from the plurality of electronic signals, means for generating phase conjugated copies of signals in the first group of signals, and means for aggregating the phase conjugated copies and the second group of signals to generate an aggregated electronic signal. In some aspects, the means for aggregating may comprise means for aggregating the phase conjugated copies and the second group of signals into sub-bands in a frequency domain via frequency-domain multiplexing (FDM), wherein the phase conjugated copies are spectrally inverted in the frequency domain. In additional or alternative aspects, the means for aggregating may comprise a digital signal processor (DSP) unit having means for aggregating the phase conjugated copies and the second group of signals into sub-bands in the frequency domain via FDM. The network device may further include means for converting the aggregated electronic signal into an aggregated analog signal, and means for transmitting the aggregated analog signal over a fiber link. In additional or alternative aspects, the network device may include a digital to analog converted (DAC) having means for converting the aggregated electronic signal into an aggregated analog signal, and at least one transmitter having means for transmitting the aggregated analog signal to the at least one ADC.

In an embodiment, the disclosure includes one or more means for executing computer instructions on a non-transitory computer-readable medium. In some aspects, the one or more means include one or more processing means for executing the computer instructions to cause the one or more processing means to perform one or more steps. In additional or alternative aspects, the one or more means include means for obtaining a plurality of electronic signals and selecting a first group of signals and a second group of signals from the plurality of electronic signals, means for generating phase conjugated copies of signals in the first group of signals, and means for generating an aggregated electronic signal by aggregating the phase conjugated copies and the second group of signals into sub-bands in a frequency domain via frequency-domain multiplexing (FDM), wherein the phase conjugated copies are spectrally inverted in the frequency domain. In some aspects, the one or more means include means for converting the aggregated electronic signal to an aggregated optical signal, and means for transmitting the aggregated optical signal over a fiber link.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network device in a wireless system, the method comprising:
   obtaining a plurality of electronic signals and selecting a first group of signals and a second group of signals from the plurality of electronic signals;
   generating phase conjugated copies of signals in the first group of signals;
   generating an aggregated electronic signal by aggregating the phase conjugated copies and the second group of signals into sub-bands in a frequency domain via frequency-domain multiplexing (FDM), wherein the phase conjugated copies are spectrally inverted in the frequency domain;
   converting the aggregated electronic signal to an aggregated optical signal; and
   transmitting the aggregated optical signal over a fiber link.

2. The method of claim 1, further comprising:
   performing an inverse fast Fourier transform (IFFT) on the aggregated electronic signal to generate an aggregated time domain signal; and
   converting the aggregated time domain signal into an aggregated analog waveform, wherein the aggregated analog waveform is configured to have a frequency domain spectrum with equally spaced channels due to the aggregation of the phase conjugated copies and the second group of signals into sub-bands in the frequency domain via FDM.

3. The method of claim 1, further comprising mapping signals in the first group to respective phase conjugated and spectrally inverted copies, wherein the phase conjugated and spectrally inverted copies are interleaved with the second group of signals, with the second group of signals corresponding to original signals selected from the plurality of electronic signals.

4. The method of claim 1, wherein the second group of signals and the phase conjugated copies are uniformly mapped in the frequency domain.

5. The method of claim 4, wherein the second group of signals and the phase conjugated copies are aggregated into the sub-bands while accounting for aliasing-induced effects associated with sampling the sub-bands at a sub-Nyquist sampling rate, and wherein the sub-Nyquist sampling rate comprises a sampling rate of fs/M, where fs is a Nyquist frequency and M is a real number greater than 1.

6. The method of claim 1, wherein the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup.

7. The method of claim 1, wherein the wireless system comprises a mobile fronthaul (MFH), and wherein sampling is performed at an intermediate node in the MFH, the intermediate node comprising a remote radio unit (RRU) or a remote radio head (RRH).

8. A network device comprising:
a digital signal processing (DSP) unit configured to:
obtain a plurality of electronic signals and select a first group of signals and a second group of signals from the plurality of electronic signals;
generate phase conjugated copies of signals in the first group of signals; and
aggregate the phase conjugated copies and the second group of signals to generate an aggregated electronic signal, wherein the DSP unit aggregates the phase conjugated copies and the second group of signals into sub-bands in a frequency domain via frequency-domain multiplexing (FDM), wherein the phase conjugated copies are spectrally inverted in the frequency domain;
a digital to analog converter (DAC) configured to convert the aggregated electronic signal into an aggregated analog signal; and
at least one transmitter configured to transmit the aggregated analog signal over a fiber link.

9. The network device of claim 8, wherein the DSP unit is further configured to perform an inverse fast Fourier transform (IFFT) on the aggregated electronic signal to generate an aggregated time domain signal, wherein the DAC is configured to convert the aggregated time domain signal into an aggregated analog waveform, wherein the aggregated analog waveform is configured to have a frequency domain spectrum with equally spaced channels due to the aggregation of the phase conjugated copies and the second group of signals into sub-bands in the frequency domain via FDM.

10. The network device of claim 8, wherein the DSP unit is further configured to map signals in the first group to respective phase conjugated and spectrally inverted copies, wherein the phase conjugated and spectrally inverted copies are interleaved with the second group of signals, with the second group of signals corresponding to original signals selected from the plurality of electronic signals.

11. The network device of claim 10, wherein the second group of signals and the phase conjugated copies are uniformly mapped in the frequency domain.

12. The network device of claim 8, wherein the DSP unit is configured to aggregate the second group of signals and the phase conjugated copies into the sub-bands while accounting for aliasing-induced effects associated with sampling the sub-bands at a sub-Nyquist sampling rate, and wherein the sub-Nyquist sampling rate comprises a sampling rate of fs/M, where fs is a Nyquist frequency and M is a real number greater than 1.

13. The network device of claim 8, wherein the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup.

14. The network device of claim 8, wherein the network device is configured to perform massive multiple-input and multiple-output (m-MIMO) transmission in a mobile fronthaul (MFH), and wherein sampling is performed at an intermediate node in the MFH, the intermediate node comprising a remote radio unit (RRU) or a remote radio head (RRH).

15. A non-transitory computer readable medium storing computer instructions, that when executed by one or more processors, cause the one or more processors to perform the steps of:
obtaining a plurality of electronic signals and selecting a first group of signals and a second group of signals from the plurality of electronic signals;
generating phase conjugated copies of signals in the first group of signals;
generating an aggregated electronic signal by aggregating the phase conjugated copies and the second group of signals into sub-bands in a frequency domain via frequency-domain multiplexing (FDM), wherein the phase conjugated copies are spectrally inverted in the frequency domain;
converting the aggregated electronic signal to an aggregated optical signal; and
transmitting the aggregated optical signal over a fiber link.

16. The non-transitory computer readable medium of claim 15, wherein the steps further comprise:
performing an inverse fast Fourier transform (IFFT) on the aggregated electronic signal to generate an aggregated time domain signal; and
converting the aggregated time domain signal into an aggregated analog waveform, wherein the aggregated analog waveform is configured to have a frequency domain spectrum with equally spaced channels due to the aggregation of the phase conjugated copies and the second group of signals into sub-bands in the frequency domain via FDM.

17. The non-transitory computer readable medium of claim 15, wherein the steps further comprise mapping signals in the first group to respective phase conjugated and spectrally inverted copies, wherein the phase conjugated and spectrally inverted copies are interleaved with the second group of signals, with the second group of signals corresponding to original signals selected from the plurality of signals.

18. The non-transitory computer readable medium of claim 17, wherein the second group of signals and the phase conjugated copies are uniformly mapped in the frequency domain.

19. The non-transitory computer readable medium of claim 18, wherein the second group of signals and the phase conjugated copies are aggregated into the sub-bands while accounting for aliasing-induced effects associated with sampling the sub-bands at a sub-Nyquist sampling rate, and wherein the sub-Nyquist sampling rate comprises a sampling rate of fs/M, where fs is a Nyquist frequency and M is a real number greater than 1.

20. The non-transitory computer readable medium of claim 15, wherein the second group of signals and the phase conjugated copies are aggregated into the sub-bands such that when sub-bands of signals in a subgroup are sampled, with the sub-bands of signals including copies of the first signals and at least one unwanted signal from the second group, an output is generated comprising a frequency component associated with the at least one unwanted signal that is substantially linearly superimposed with a frequency component associated with copies of the first signals in the subgroup.

* * * * *

UNITED STATES PATENT AND TRADEMARK OFFICE
CERTIFICATE OF CORRECTION

PATENT NO. : 9,793,996 B2
APPLICATION NO. : 15/262906
DATED : October 17, 2017
INVENTOR(S) : Xiang Liu et al.

Page 1 of 1

It is certified that error appears in the above-identified patent and that said Letters Patent is hereby corrected as shown below:

On the Title Page

(56) References Cited, Foreign Patent Documents, Line 1 should read:
CN 102523048 A 6/2012

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*